Oct. 14, 1969 TADAO SHIMONO 3,472,517

CLEANER FOR A PHONOGRAPH RECORD

Filed Sept. 21, 1967 2 Sheets-Sheet 1

Tadao Shimono

INVENTOR.

BY

George B. Oujevolk

Attorney

Oct. 14, 1969 TADAO SHIMONO 3,472,517

CLEANER FOR A PHONOGRAPH RECORD

Filed Sept. 21, 1967 2 Sheets-Sheet 2

Tadao Shimono
INVENTOR.

BY George B. Oujevolk
Attorney

United States Patent Office 3,472,517
Patented Oct. 14, 1969

3,472,517

CLEANER FOR A PHONOGRAPH RECORD

Tadao Shimono, 971 Oaza Utsuishimo, Shimonoseki-shi, Japan

Filed Sept. 21, 1967, Ser. No. 669,517
Claims priority, application Japan, Sept. 28, 1966, 41/91,204; Oct. 1, 1966, 41/92,195; Dec. 26, 1966, 42/1,234
Int. Cl. G11b *3/58*
U.S. Cl. 274—47 1 Claim

ABSTRACT OF THE DISCLOSURE

A phonograph record cleaner comprising two frames each having an opposing face which is covered with a velvety fabric piece and each including a raised portion which together form a fulcrum of the strip frames, the strip frames being manually moved about the fulcrum so as to cause the opposing faces to come together and contact and clean the grooved surfaces of a phonograph record when said record is inserted between both opposing faces.

Background of the invention

This invention relates to cleaners for a phonograph record and more particularly to a cleaner comprising a the couple of strip frames 1 has an opposing face 5 which simultaneously both surfaces of a phonograph record.

For lovers of disk music, it is a trouble to remove the dust and/or thumbmarks on the surfaces of a phonograph record, deteriorating the tone quality. Furthermore, it is a laborious or difficult operation to wipe off the dust and/or thumbmarks entirely and surely.

Summary of the invention

An object of this invention is to provide a cleaner for a phonograph record easily wiping off the dust and/or thumbmarks entirely, surely and quickly.

A further object of this invention is to provide a cleaner for a phonograph record which can be used not only as the wiper but also a pincette to take a disk from a disk stand to a turn-table or vice versa.

Description of the preferred embodiment

Figures 1, 2:
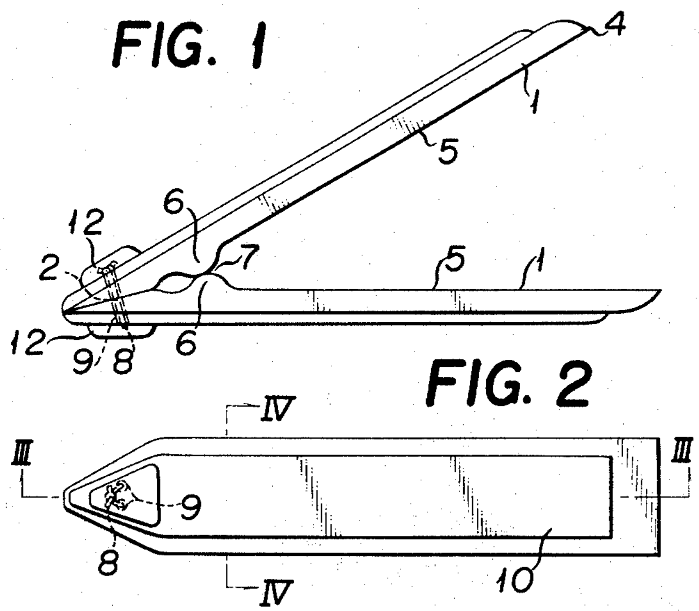
FIG. 1 is a side elevational view illustrating a cleaner according to the invention.
FIG. 2 is a plan view illustrating the cleaner in FIG. 1.
Figure 4:
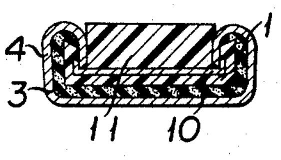
FIG. 4 is a sectional view taken along a surface IV—IV and viewed in the direction of arrows in FIG. 2.
Figure 3:
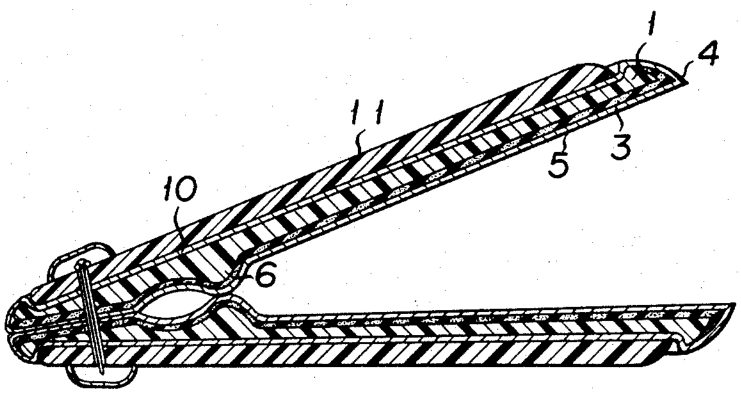
FIG. 3 is a sectional view taken along a surface III—III in FIG. 2.

Referring to the drawing, a cleaner for a phonograph record according to this invention comprises a couple of strip frames 1, a tension spring means 2, a pair of soft pads 3, and a pair of velvety fabric pieces 4. Each of the couple of strip frames 1 has an opposing face 5 which includes one of raised portions 6 forming together a fulcrum 7 of the strip frames 1. The strip frames are moved about the fulcrum 7 to cause the opposing faces 5 to come off from or nearer to each other by manual operation. The tension spring means 2 is located at one end parts of the frames to which the raised portions are respectively positioned adjacent. More particularly, the tension spring means 2 includes a string 8 of which both ends are tied to each other and which passes through a pair of bores 9 penetrated through opposing ends of the frames. The string 8 is made of such an elastic cord as a rubber string. The soft pads 3 are each laid at least on the opposing face 5. Each of the frames 1 is preferably enveloped with the soft pad 3 made of foamed resilient synthetic resin. The soft pads 3 are respectively covered with the velvety fabric pieces 4. Each of the frames 1 has a rectangular groove 10 in which edges of the pad 3 and the velvety fabric 4 are inserted and fixed with suitable means. In the rectangular groove 10 is fixedly inserted an ornamental plate 11 to consolidate the locations of the edges of the pad 3 and the velvety fabric 4. An end remote from the end near the fulcrum 7 of each of the frames is preferably formed into a knife edge, whereby the cleaner easily takes the phonograph record from the disk stand to the turntable or vice versa. An ornamental piece is preferably mounted on the end part on which the string 8 is exposed of each of the frames to put the spring means 2 out of sight as indicated at 12.

In operation, the phonograph record is picked up from the disk stand by utilizing the knife edges and held between the opposing faces 5 covered with the velvety fabric pieces 4, and then slided about the center of the disk to remove the dust and/or thumbmarks therefrom. In this case, the raised portions 6 function to average throughout the opposing faces the loads transmitted from the opposing faces 5 to both surfaces of the disk. Provided the side surfaces of the frames 1 are covered with parts of the pad 3 and the velvety fabric 4, they can be utilized to remove or wipe off the dust and/or thumbmarks from an upper surface of the disk rest on the turntable.

Where two cleaners are utilized, one of the cleaners acts as a holder being proof against the thumbmarks, while the other acts as a wiper. There is nothing to be touched to the disk except the cleaners.

In the arrangement, one of the raised portions has a convex top while the other has a concave top, to interconnect them to each other to form the fulcrum.

While the invention has been described in connection with some preferred embodiments thereof, the invention is not limited thereto and includes any modifications and alterations which fall within the true spirit and scope of the invention.

What is claimed is:

1. A cleaner for a phonograph record comprising a pair of elongated strip frames each having a raised portion transverse to said strip frames so as to jointly form a fulcrum for the strip frames, a spring means located at one end of the strip frames while the other end of said strip frames are respectively formed into knife edges, a pair of soft pads laid on the inner surfaces of the strip frames and a pair of velvety fabric pieces covering the soft pads.

References Cited

UNITED STATES PATENTS

| | | | |
|---|---|---|---|
| 2,452,107 | 10/1948 | Cranney. | |
| 2,977,127 | 3/1961 | Mertes | 274—47 |

LEONARD FORMAN, Primary Examiner

F. J. D'AMBROSIO, Assistant Examiner

U.S. Cl. X.R.

15—210.1